United States Patent
Aasheim et al.

(10) Patent No.: US 9,026,814 B2
(45) Date of Patent: May 5, 2015

(54) POWER AND LOAD MANAGEMENT BASED ON CONTEXTUAL INFORMATION

(75) Inventors: Jered Aasheim, Bellevue, WA (US); Dominique Fortier, Issaquah, WA (US); Michael Hall, Snohomish, WA (US); Akshay Johar, Bellevue, WA (US); Daniel Reed, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 138 days.

(21) Appl. No.: 13/162,583

(22) Filed: Jun. 17, 2011

(65) Prior Publication Data

US 2012/0324259 A1  Dec. 20, 2012

(51) Int. Cl.
| | |
|---|---|
| *G06F 1/32* | (2006.01) |
| *G06F 9/50* | (2006.01) |
| *H04L 12/12* | (2006.01) |
| *H04W 52/02* | (2009.01) |

(52) U.S. Cl.
CPC .............. *G06F 1/3206* (2013.01); *G06F 1/329* (2013.01); *G06F 9/5094* (2013.01); *H04L 12/12* (2013.01); *H04W 52/0258* (2013.01); *H04W 52/0261* (2013.01); *Y02B 60/142* (2013.01); *Y02B 60/50* (2013.01)

(58) Field of Classification Search
CPC ....... G06F 1/329; G06F 1/3293; Y02B 60/16; Y02B 60/162
USPC .......................................... 713/310, 320, 340
See application file for complete search history.

(56) References Cited

U.S. PATENT DOCUMENTS

| | | | |
|---|---|---|---|
| 7,076,255 B2 | 7/2006 | Parupudi et al. | |
| 7,945,470 B1 | 5/2011 | Cohen et al. | |
| 8,121,618 B2 * | 2/2012 | Rhoads et al. | 455/456.1 |
| 8,380,999 B1 * | 2/2013 | Robison et al. | 713/300 |
| 2004/0123172 A1 * | 6/2004 | Sheller | 713/323 |
| 2009/0119233 A1 * | 5/2009 | Dunagan et al. | 705/412 |
| 2009/0164772 A1 | 6/2009 | Karkaria et al. | |
| 2009/0265704 A1 * | 10/2009 | Branda et al. | 717/176 |
| 2009/0271639 A1 | 10/2009 | Burge et al. | |

(Continued)

OTHER PUBLICATIONS

Ravi, et al., "Context-aware Battery Management for Mobile Phones: A Feasibility Study", Retrieved at <<http://reality.media.mit.edu/pdfs/Ravi.pdf>>, 2006, pp. 16.

(Continued)

*Primary Examiner* — Vincent Tran
(74) *Attorney, Agent, or Firm* — Nicholas Chen; Kate Drakos; Micky Minhas

(57) ABSTRACT

A power context system is described herein that makes decisions related to device power usage based on factors such as location, load, available alternatives, cost of power, and cost of bandwidth. The system incorporates contextual knowledge about the situation in which a device is being used. Using the context of location, devices can make smarter decisions about deciding which processes to migrate to the cloud, load balancing between applications, and switching to power saving modes depending on how far the user is from a power source. As the cloud becomes more frequently used, load balancing by utilizing distributed data warehouses to move processes to different locations in the world depending on factors such as accessibility, locales, and cost of electricity are considerations for power management. Power management of mobile devices is becoming important as integration with the cloud yields expectations of devices being able to reliably access and persist data.

18 Claims, 3 Drawing Sheets

(56) References Cited

U.S. PATENT DOCUMENTS

| | | | |
|---|---|---|---|
| 2010/0105409 A1 | 4/2010 | Agarwal et al. | |
| 2010/0131592 A1 | 5/2010 | Zhang et al. | |
| 2010/0198972 A1 | 8/2010 | Umbehocker | |
| 2011/0143811 A1* | 6/2011 | Rodriguez | 455/556.1 |
| 2011/0159931 A1* | 6/2011 | Boss et al. | 455/574 |
| 2011/0289329 A1* | 11/2011 | Bose et al. | 713/320 |
| 2012/0083258 A1* | 4/2012 | Rabii | 455/418 |
| 2012/0198251 A1* | 8/2012 | Boldryev et al. | 713/310 |
| 2012/0210325 A1* | 8/2012 | de Lind van Wijngaarden et al. | 718/103 |
| 2012/0272077 A1* | 10/2012 | Dow et al. | 713/310 |
| 2012/0329483 A1* | 12/2012 | Vengroff et al. | 455/456.3 |
| 2013/0072215 A1* | 3/2013 | Persson | 455/456.1 |

OTHER PUBLICATIONS

Ye, et al., "A Framework for QoS and Power Management in a Service Cloud Environment with Mobile Devices", Retrieved at <<http://ieeexplore.ieee.org/stamp/stamp.jsp?arnumber=05569901>>, Proceedings of Fifth IEEE International Symposium on Service Oriented System Engineering, Jun. 4-5, 2010, pp. 236-243.

"Special Topic: Mobile Cloud Computing and Applications", Retrieved at <<http://wwwen.zte.com.cn/endata/magazine/ztecommunications/2011Year/no1/201103/P020110318511856092974.pdf>>, vol. 9 No. 1, Mar. 18, 2011, pp. 70.

Harris, et al., "Exploiting User Behaviour for Context-Aware Power Management", Retrieved at <<http://www.scss.tcd.ie/publications/tech-reports/reports.05/TCD-CS-2005-68.pdf>>, Proceedings of IEEE International Conference on Wireless and Mobile Computing, Networking and Communications, vol. 4, Aug. 22-24, 2005, pp. 9.

Harris, et al., "An Empirical Study of the Potential for Context-Aware Power Management", Retrieved at <<http://www.cs.sunysb.edu/~jwong/CSE594-F08/Reader/Power.pdf>>, Proceedings of the 9th international conference on Ubiquitous computing, Nov. 21, 2007, pp. 19.

Chun, et al., "Augmented Smartphone Applications Through Clone Cloud Execution", Retrieved at <<http://berkeley.intel-research.net/bgchun/clonecloud-hotos09.pdf>>, Proceedings of the 12th conference on Hot topics in operating systems, May 7, 2009, pp. 1-5.

Mehta, et al., "Energy Conservation in Cloud Infrastructures", Retrieved at <<http://iiitb.biz/srao/papers/mehta2011.pdf>>, 5th Annual IEEE Systems International Conference, Apr. 2011, pp. 5.

Zhang, et al., "Towards an Elastic Application Model for Augmenting Computing Capabilities of Mobile Platforms", In the proceedings of Third International Conference, mobilware 2010, Jun. 30-Jul. 2, 2010, pp. 16.

"International Search Report", Mailed Date: Feb. 26, 2013, Application No. PCT/US2012/042741, Filed Date: Jun. 15, 2012, pp. 1-11.

* cited by examiner

POWER AND LOAD MANAGEMENT BASED ON CONTEXTUAL INFORMATION

BACKGROUND

Energy efficiency is increasingly becoming an important differentiator from mobile phones to datacenters. Customers are willing to pay a premium for longer lasting mobile device experiences but also are anxious to get increasing performance from these same devices. On the other end of the scale, datacenters continue to scale up compute power but face thermal limits for what can be efficiently cooled. In addition, the public is increasingly more conscious of energy usage and environmental impact of energy use. Making efficient use of energy is therefore a higher priority design goal in many types of computing systems.

As mobile devices become ubiquitous, power management and integration with the cloud become increasingly important to provide uninterrupted access and persistence of data on mobile devices. Mobile devices today typically have relatively few power states. The device is either in use operating at full power, or in a standby or idle state and operating at low power. If the battery is low, the device may take some steps to reduce power usage, such as dimming the screen. However, such actions may interfere with the user's use of the device.

Datacenters face similar issues. In some cases, an organization operates multiple datacenters and has the flexibility to route computing requests to more than one datacenter based on certain criteria. For example, the datacenter operator may be able to route only as many requests to a datacenter as the datacenter has computing and cooling capacity. The operator can then send any overflow requests to another datacenter at another location.

The decisions made in these situations are often not made optimally because they are made without using complete knowledge of the situation. For example, a datacenter may not anticipate that based on the time of day, the client requests are about to drop dramatically so that offloading work is not needed or is only temporarily needed. Likewise, a mobile device may not anticipate that the user plans to plug in the device in 10 minutes, so the existing amount of battery life, even though low, is sufficient to allow the user to use the full capabilities of the device. These decisions lead to results that are not as desirable as what could be achieved with smarter devices, or by using the comprehensive set of contextual knowledge available for the circumstances in which the devices operate.

SUMMARY

A power context system is described herein that makes decisions related to device power usage based on factors such as location, load, available alternatives, cost of power, and cost of bandwidth. The system incorporates contextual knowledge about the situation in which a device is being used. Using the context of location, devices can make smarter decisions about deciding which processes to migrate to the cloud, load balancing between applications, and switching to power saving modes depending on how far the user is from a power source. As the cloud becomes more frequently used, load balancing by utilizing distributed data warehouses to move processes to different locations in the world depending on factors such as accessibility, locales, and cost of electricity are considerations for power management. Power management of mobile devices is becoming increasing important as the prevalence of mobile devices and integration with the cloud yields expectations of devices being able to reliably access and persist data. Devices that make smart decisions managing power depending on the environmental context, context of resources available in the system, and offloading processor expensive computing to the cloud in order to save power are more useful to users. Thus, the power context system can provide lower datacenter costs, extended mobile battery life, and a more satisfactory user experience.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
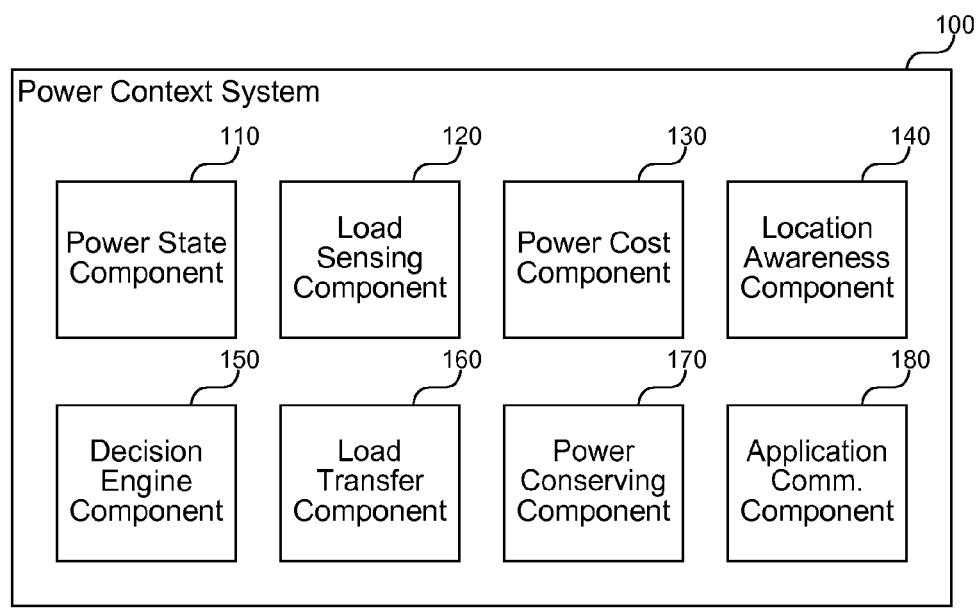
FIG. 1 is a block diagram that illustrates components of the power context system, in one embodiment.

A power context system is described herein that makes decisions related to device power usage based on factors such as location, load, available alternatives, cost of power, and cost of bandwidth. The system is smarter than previous systems because it incorporates contextual knowledge about the situation in which a device is being used. Using the context of location, devices can make smarter decisions about deciding which processes to migrate to the cloud, load balancing between applications, and switching to power saving modes depending on how far the user is from a power source (where "far" can be geographical distance or the time until the user is expected to be near an available power source). For example, if a user is running a processing-intensive application on a mobile device with a low battery, but based on the user's location the user will be home soon where the device can be recharged, then the system may take less power-saving action than if the user was traveling far away from a power source. Similarly, if a datacenter server is processing a load in an area during peak electricity cost and another datacenter is available in another part of the world at non-peak electricity cost, then the server may transfer the load to the other datacenter with a lower cost of power. The availability of these alternatives, as well as contextual information, factor into the decisions made by the system.

The power context system makes decisions related to cost of power. In the mobile device scenario, the cost of power is that the device will stop working. In the datacenter scenario, the cost is dollars. One task of the system is to use various contextual information and externalities to determine what to do to optimize for the cost of power. If a cheap power source is nearing availability or the cost of power (e.g., in a datacenter) is about to decrease, then the decision may be to just keep going. Otherwise, the decision may be to migrate to another "node" where the cost of power is lower. The phone may migrate the workload to the datacenter and the datacenter might migrate to another data center (or the phone).

Devices can also make smarter decisions about which data connection to make based on location and historical knowledge/data. For example, if a user is close to the home/office, then the device might stall a download over the cellular network and wait until a higher bandwidth Wi-Fi network connection is available. Some devices also limit download size over some networks, and waiting may allow a larger file to be downloaded. If the device knows that a better connection will soon be available, then the device can queue the download to start once the appropriate network is available.

As the cloud becomes more frequently used, load balancing by utilizing distributed data warehouses to move processes to different locations in the world depending on factors such as accessibility, locales, and cost of electricity are considerations for power management. Power management of mobile devices is becoming increasing important as the prevalence of mobile devices and integration with the cloud yields expectations of devices being able to reliably access and persist data. Devices that make smart decisions managing power depending on the environmental context, context of resources available in the system, and offloading processor expensive computing to the cloud in order to save power are more useful to users. Migration can also occur in the other direction, with a cloud offloading work to one or a network of other devices (e.g., like the SETI project). Thus, the power context system can provide lower datacenter costs, extended mobile battery life, and a more satisfactory user experience.

For mobile devices, effective power management of applications and the resources helps prolong the battery life of a device. When the mobile device is plugged in or is fully charged, applications may request higher computing power. However, when battery power is low, continual use of high computing power will quickly drain the battery resulting in potential data loss or interrupted use of the device. Hence, depending on the amount of power available to a mobile system, applications that utilize different amounts of power may be allowed to execute. An event-based subsystem can help balance computational load between applications depending on the power available. Events allow applications to communicate the amount of computational power and memory resources needed as well as an amount of resources available that the application is not using. The system may monitor the events between applications and load balance, so that applications that are computationally expensive may be suspended when there is low power and resources may be reallocated among applications when more resources become available.

The power context system can use the context of where the device is geographically located and how long until an expected m a power source is available to determine which applications are allowed to run and which are powered down. Typically, computationally intensive applications are powered down first when power is low. However, if the device can utilize its location context and destination and determine that it is headed home in a few minutes where an inexpensive power source is available, then it may not be necessary to conserve power. As a result, computationally expensive applications may continue to run despite the low power system state. Utilizing location context may allow devices to dynamically make smarter decisions and anticipate whether it needs to conserve power. In addition, contextual information about availability of alternative resources, such as a cloud accessible by the device, can allow the device to offload computationally intensive tasks to the cloud while the device is put to sleep or allowed to run other applications. Based on the device's location, the user may be able to receive the result of the offloaded work either at another device at a subsequent location (e.g., the user's desktop computer at work) or on the mobile device after it is connected to a power source.

The power context system may also use heuristics based on sensing the environment to determine when various device subsystems should be accessed based on a current power/location/usage model. System calls to the kernel are more computationally expensive than others. A handshake between the kernel and sensors can be utilized to manage power amongst applications. For example, the system may allow a small subset of low-power sensors to operate while the device is in a low power state, and if something significant is detected by the sensors the system may wake the device into a higher power state for brief processing of events that are more complex. In some cases, sensors may offer a lower fidelity, lower power mode where some comprehensiveness of sensing can be traded off for lower power use. This may provide good enough information to detect whether it is worthwhile to wake up more sensors to get a higher fidelity reading at the cost of more power usage.

Process state migration to the cloud may be used to offload computationally expensive work, provide storage in the cloud, or migrate processes to another device to continue processing, such as migration from a phone to a computer. The cloud may act as a virtualized environment that is an extension to the mobile device and may be seamlessly integrated with the mobile system for load balancing. Processes such as background services running on the system may be switched to a virtualized process running from the cloud.

As cloud computing becomes more prevalent, power management of data centers also becomes an important issue. Load balancing processes amongst distributed data centers may be based on electricity costs. Processes may be moved to different locations depending on where electricity costs are cheaper or processes may be scheduled so that execution is not done during peak hours. For example, routine daily batch processing may be delayed until off-peak hours to allow cheaper electricity costs, more processing while external temperatures are lower (and thus datacenter cooling costs are lower), and so on. Because cloud computing is a virtualized environment, bandwidth and security are important issues to address. Depending on the locale, weather, and geopolitical factors, data may be restricted to certain data warehouse locations. For example, some organizations may be restricted from storing some data in particular countries, so that migration to datacenters in those countries is prohibited. Frequency of access of data can also factor in to the locations where data can be pushed. Frequently accessed data is kept near at hand while less frequently accessed data can be moved to locations that are less quickly accessible (and cheaper or underutilized).

FIG. 1 is a block diagram that illustrates components of the power context system, in one embodiment. The system 100 includes a power state component 110, a load-sensing component 120, a power cost component 130, a location awareness component 140, a decision engine component 150, a load transfer component 160, a power conserving component 170, and an application communication component 180. Each of these components is described in further detail herein.

The power state component 110 maintains information describing a current power state of a computing device. For example, the component 110 includes knowledge of whether a mobile device is being actively used, is in a sleep state, has dimmed the backlight/screen, and so forth. For a datacenter, the component 110 includes performance counters, operating system power states, knowledge of device states, and so on. The power state component 110 provides information to the system 100 for making decisions about whether to enter a different power state and about how much power the device is presently using. Based on received requests to use more or less power, the system 100 may use this information to transition the device to a higher or lower power state. For example, if the user requests running a processing-intensive application and the device is in a sleep state, then the system 100 may decide whether to wake up the device or defer the user request to another time (or to another device or cloud).

The load-sensing component 120 senses one or more load requests caused by activity on the computing device. Loads may come from client requests, interactive users, application background tasks, operating system services, batch processing, or any other task that consumes resources on the computing device. The load sensing component 120 provides information as loads begin, when future loads are expected, when loads complete, and at other times of potential transition from one level of load to another. The system 100 uses this information to select between available power states of the device, and to determine whether alternative devices will be used to handle all or some of the load by transferring the load to the alternative devices. For example, a datacenter server experiencing a high load (and corresponding high power cost) may transfer some load to another datacenter for completion.

The power cost component 130 determines current and future costs of power for the computing device. The component 130 may receive information from utilities or the administrator that identify peak and non-peak times of day or other power cost tiers. The component 130 may also receive information identifying a geographic location of the computing device, daily temperature information, and other information that affects cost of power. For mobile devices, the component 130 may coordinate with the location awareness component 140 to know the cost of power in a present location versus cost of power in expected subsequent locations. Cost may include financial cost as well as effort to get more power, the difference in battery use and corded power use in mobile devices (e.g., the former may be limited and the latter not), and so forth.

The location awareness component 140 determines a current location of the computing device and determines one or more potential subsequent locations of the device. The component 140 may access global positioning system (GPS) receiver hardware installed in the device, cellular tower information, Wi-Fi information, or other location data for triangulating or determining the device's location. Datacenters may also have location awareness, through explicit configuration information or through externally available information, such as GPS, Wi-Fi, or other signals. Some datacenters today are even mobile, including those housed in containers moved by vehicle. In addition, the component 140 may access an electronic calendar associated with the user of the device to determine locations where the device may be for future appointments. The component 140 may also track historical information and trends to determine habits of the user and where the user may take the device at any particular time. For example, if the device's present location is near a location where the user takes the device every day at nearly the same time, then the component 140 may determine that the device will be at the common destination soon. The destination may be the user's home or office and may be a location where the device typically has access to additional power, communication, or processing resources. This information is factored in by the decision engine component 150 to determine how to manage the device.

The decision engine component 150 receives information from other components and makes decisions related to power states of the computing device and whether to transfer loads to other devices. The decision engine component 150 may use a variety of heuristics, profiles, policies, and other information or methods to make decisions about how to manage the device. In some cases, an administrator develops a power policy for devices associated with an organization or business. For example, the policy may indicate that the decision engine component 150 will maximize battery life (e.g., by offloading work or entering lower power states) when the user is far from a power source, and maximize processing capabilities when the user is near a power source. For a datacenter, a policy may indicate that the component 150 will minimize electric cost, thermal elevation, and/or cost of bandwidth by offloading work to non-peak datacenters when possible. The decision engine component 150 invokes the load transfer component 160 and power-conserving component 170 to carry out decisions and take other actions.

The load transfer component 160 transfers a computing load from the computing device to a secondary computing device. In some cases, the computing device is a mobile device and the secondary computing device is a datacenter or cloud server that can execute processing tasks on behalf of the mobile device. In other cases, the computing device may be a datacenter server itself, and the secondary computing device may be another datacenter server, a distributed network of mobile devices, a home server, or any other computing resource. The transfer of loads is intended to find a good place for processing a load at low cost, low power usage, or to meet other goals. The transfer may include transferring an entire process or parts of a process that can be carved up and distributed.

The power-conserving component 170 transitions the computing device from the current power state to another or prevents a transition from the current power state. In some cases, the component 170 may override default behavior of a device to transition power states by preventing the transition. For example, this decision may be based on expected subsequent access to additional power based on location. In other cases, the component 170 may transition the device from a higher power state to a lower power state or vice versa, based on instructions received from the decision engine component 150, including those based on location, cost of power, available alternatives, and so forth.

The application communication component 180 optionally provides an event-based communication facility between applications operating on the computing device to coordinate power needs and availability on the computing device. Many tasks performed by computing devices are optional or may be deferred to another time without frustrating the task's purpose. For example, a computing device may perform batch processing, system maintenance, or other tasks routinely but not have a specific deadline for their performance. Thus, if a system maintenance task communicates to other applications that it wants to run and none respond, it may run without interfering with other applications. On the other hand, if another application indicates that it is doing processing intensive work or wants to use a last available amount of power, then the maintenance task may defer its work to make power or resources available to the other application.

The computing device on which the power context system is implemented may include a central processing unit, memory, input devices (e.g., keyboard and pointing devices), output devices (e.g., display devices), and storage devices (e.g., disk drives or other non-volatile storage media). The memory and storage devices are computer-readable storage media that may be encoded with computer-executable instructions (e.g., software) that implement or enable the system. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, set top boxes, systems on a chip (SOCs), and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
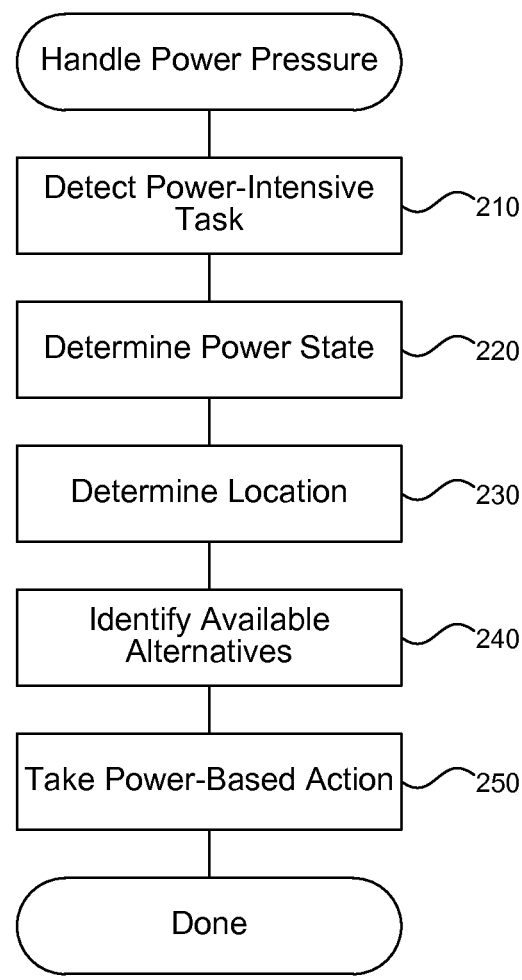
FIG. 2 is a flow diagram that illustrates processing of the power context system to managed power in a computing device based on location, in one embodiment.

FIG. 2 is a flow diagram that illustrates processing of the power context system to managed power in a computing device based on location, in one embodiment.

Beginning in block 210, the system detects a power-intensive task invoked on the computing device. For example, a user may run an application or request information, an application may request to perform background or other processing, a service of the operating system may request to perform system maintenance, and so on. The system may receive information from the application or other sources describing the resource demands of the task, such as amount of processing, memory, bandwidth, or other resources that will be used. Based on this information the system may determine whether to allow the task to run at all or whether to run the task remotely on another device.

Continuing in block 220, the system determines a current power state of the computing device. For example, the power state may include a voltage level of the processor, banks of memory that are turned on and off, a screen brightness or backlight state, whether one or more sensors and communication hardware are powered, and so forth. The system gathers power state information from the device and may query applications to determine a power state that is currently expected for completing existing tasks. Based on the power state, the system may determine a new power state to which to transition the device or may determine whether adding the new requested task would overload the device or use too much power.

Continuing in block 230, the system determines a location of the device and a proximity to additional power and/or computing resources. The location may include a GPS location, a conceptual location (e.g., 5 miles from home), an address, or other information that helps the system to determine an availability of power to determine whether the device's current power level is sufficient to complete intervening tasks and to determine whether other devices might more efficiently handle the task (e.g., based on lower cost of power at their location).

Continuing in block 240, the system identifies one or more alternative devices for performing the requested task. For example, the system may determine whether a connection is available to a datacenter or cloud, whether other devices are in proximity using Bluetooth or other communication protocols, whether the device is docked or tethered to another computing device, cost of bandwidth (e.g., based on a mobile data plan or datacenter bandwidth costs), and so on. The system may also request information describing availability and cost of power for the alternative computing resources, so that the decision engine can determine where to locate processing tasks to manage efficiency and cost.

Continuing in block 250, the system takes a power-based action to manage the computing device based on the determined location of the device and other received information. The action may include transitioning the current power state of the device to another power state, preventing transitioning of the power state of the device, transitioning the requested task or other loads running on the computing device to one or more alternative computing devices, and so forth. The system selects an action that will provide the user or users of the computing device with the best possible experience while efficiently using power and managing cost. The action taken may be based on one or more policies defined by a system administrator or specified by the device user to meet particular goals of an organization or the user. After block 250, these steps conclude.

Figure 3:
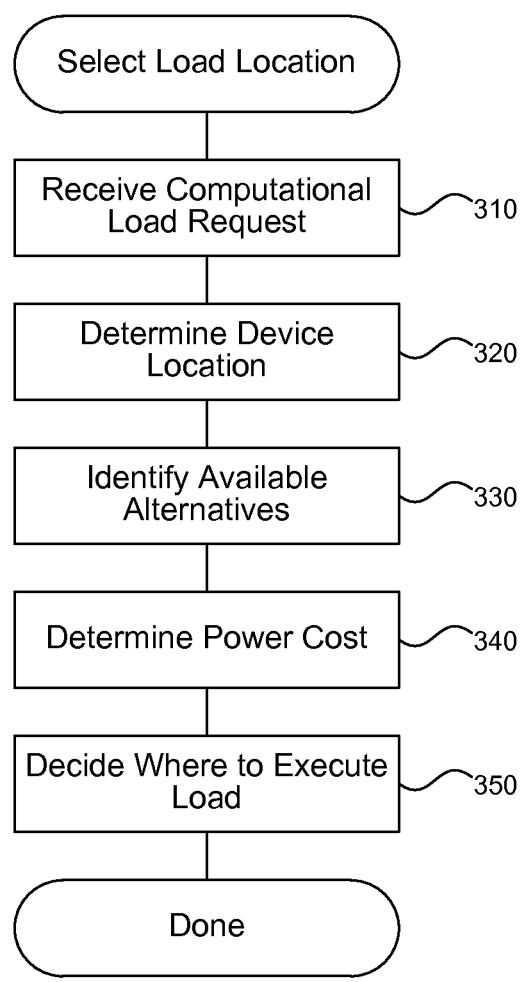
FIG. 3 is a flow diagram that illustrates processing of the power context system to transfer a computing load from one computing device to another computing device, in one embodiment.

FIG. 3 is a flow diagram that illustrates processing of the power context system to transfer a computing load from one computing device to another computing device, in one embodiment.

Beginning in block 310, the system receives a request to execute a task that will produce a computational load on one or more resources of the computing device. For example, a user may launch an application, a datacenter may instantiate a server process for handling user requests, and so on. The system may use heuristics or received information to determine a level associated with the requested load and to identify which resources the load will consume. The system uses this and other information to determine whether to execute the load locally, remotely, or a combination of the two.

Continuing in block 320, the system determines a location associated with the computing device that determines availability of additional power and/or computing resources. The location may include a GPS location, a conceptual location (e.g., 5 minutes from home), an address, or other information that helps the system to determine an availability of power to determine whether the device's current power level is sufficient to complete intervening tasks and to determine whether other devices might more efficiently handle the task (e.g., based on lower cost of power at their location). In some cases, location information includes determining latency and bandwidth of a connection to a remote location for completing the task, an expected duration for completing the task if the system executes the task remotely versus locally, and so on.

Continuing in block 330, the system identifies one or more alternative devices for performing the requested task. For example, the system may determine whether a connection is available to a datacenter or cloud, whether other devices are in proximity using Bluetooth or other communication protocols, whether the device is docked or tethered to another computing device, cost of bandwidth, and so on. The system may also request information describing availability and cost of power for the alternative computing resources, so that the decision engine can determine where to locate processing tasks to manage efficiency and cost.

Continuing in block 340, the system determines a power cost for executing the requested load locally on the computing device and at one or more of the identified alternatives. Power cost may include monetary cost, thermal load produced by execution at each location, the availability of other devices for other tasks, and so on. The system may also determine a time of day at each location and a cost of power based on the determined time of day. For example, many electric utility companies charge a different rate for power at peak times of day than for off-peak times of day. Because datacenters may be in different time zones, a datacenter in a peak cost location may be able to transfer at least some tasks to a datacenter in a non-peak cost location.

Continuing in block 350, the system decides whether to execute the requested load on the local computing device or to transfer at least some of the requested load to an identified alternative computing device. The system may make decide based on location information and environmental factors that will change for the computing device upon arrival at a subsequent location. The system may also decide based on power cost, bandwidth cost, or other information describing loads on the local computing device and one or more identified alternative computing devices. For example, if a mobile device is low on battery or predicts a need for all available battery life upon receiving a new task, the device may transfer the task to a cloud for execution and save the battery life of the mobile device for other tasks. As another example, a datacenter in a high power cost area may defer tasks until a lower power cost time of day or transfer tasks to a lower cost datacenter. The system picks the most efficient location for performing each task based on the additional information available that is not considered by previous systems. After block 350, these steps conclude.

In some embodiments, the power context system operator has software licensing or other agreements with a carrier or other entity that affect decisions made by the system. For example, a cellular carrier may define a policy that specifies power profiles for using Wi-Fi, 3G, 4G, or other sensors and communication hardware. For some user data plans, the carrier may select a profile that uses the least cost communication hardware for the carrier, while with other data plans the carrier may optimize battery life or throughput for the device. In some cases, the carrier may offer a premium plan that maximizes quality of service (QoS) experienced by a user of the device.

In some embodiments, the power context system may manage communication costs by selecting particular communication hardware. Although processing and electricity costs have been used in examples herein, users face other types of costs. For example, a user with a 3G plan from a cellular carrier that include a finite amount of data transfer before additional costs are levied may want a device to prefer a Wi-Fi connection when available. In some cases, based on location information the device may wait until a user is home to be able to perform some tasks via Wi-Fi (thus not using the 3G data plan resources) that would otherwise be performed using 3G data plan resources. The mobile device may include a setup phase during which a user provides such preferences or they may be provided by the carrier or other entities (such as information technology (IT) personnel at the user's place of employment).

In some embodiments, the power context system factors in a cost associated with transferring a load to a remote location. For example, transferring may include bandwidth usage of sending the task and receiving results. Some tasks may also involve user input or other communication at various intermediate stages of task completion. Based on this information, the latency or bandwidth cost of transferring the load may be undesirable even though other factors (such as maximizing local device battery life) may point in favor of the transfer. Thus, the system can factor in a variety of concerns and competing goals to determine an appropriate location to execute each load.

In some embodiments, the power context system includes a historical data store that includes historical information observed by the system. The system may use learning or other techniques to spot trends and improve the decision-making process based on past user habits, trends aggregated from a large body of users, or other information. The system may store information over time and use this information as feedback to make the decisions made by the systems better. In some embodiments, the system provides reports to an administrator that can modify the system based on how well present decisions are working to meet power, cost, and other goals.

From the foregoing, it will be appreciated that specific embodiments of the power context system have been described herein for purposes of illustration, but that various modifications may be made without deviating from the spirit and scope of the invention. Accordingly, the invention is not limited except as by the appended claims.

We claim:

1. A computer-implemented method for managing power in a computing device based on location, the method comprising:
   detecting a power-intensive task invoked on the computing device;
   determining a current power state of the computing device;
   determining a location of the device and a proximity to additional power and/or computing resources wherein determining further comprises determining an availability of power and whether the device's current power level is sufficient to complete tasks that will occur before the user reaches a location of an additional power source;
   identifying one or more alternative devices for performing the requested task by requesting information describing availability and a monetary cost of power for the alternative computing devices;
   receiving information from the one or more identified alternative devices, the received information describing characteristics of each of the one or more identified alternative devices;
   determining suitability of the identified one or more alternative devices for performing the requested task based on the received information; and
   taking a power-based action to manage the computing device based on the determined location of the device, other received information, and the determined suitability of the identified one or more alternative devices;
   wherein the preceding steps are performed by at least one processor.

2. The method of claim 1 wherein detecting the power-intensive task comprises determining an application run by a user of the computing device.

3. The method of claim 1 wherein detecting the power-intensive task comprises receiving information from an application or other sources describing one or more resource demands of the task.

4. The method of claim 1 wherein detecting the power-intensive task comprises determining whether to allow the task to execute locally or whether to execute the task remotely on another device.

5. The method of claim 1 wherein determining the current power state comprises determining at least one of a voltage level and frequency of a processor, one or more banks of memory that are turned on and off, a screen brightness, a backlight state, and whether one or more sensors, peripherals, and communication hardware are powered.

6. The method of claim 1 wherein determining the current power state comprises gathering power state information from the device and querying applications to determine a power state that is currently expected for completing existing tasks.

7. The method of claim 1 wherein determining the current power state comprises determining a new power state to which to transition the device.

8. The method of claim 1 wherein determining the location of the device comprises determining whether another device can more efficiently handle the task.

9. The method of claim 1 wherein identifying alternative devices comprises determining whether a connection is available to a datacenter or cloud that could handle the detected task.

10. The method of claim 1 wherein taking a power-based action comprises at least one of transitioning the current power state of the device to another power state, preventing transitioning of the power state of the device, and transitioning the requested task or other loads running on the computing device to one or more alternative computing devices.

11. The method of claim 1 wherein taking a power-based action comprises selecting an action that will provide the user or users of the computing device with a good experience while efficiently using power and managing cost.

12. A computer system for power and load management based on contextual Information on a computing device, the system comprising:
   a processor and memory configured to execute software instructions embodied within the following components;
   a power state component that maintains information describing a current power state of the computing device;
   a load-sensing component that senses one or more load requests caused by activity on the computing device;
   a power cost component that determines current and future costs of power for the mobile computing device;
   a location awareness component that determines a current location of the computing device and determines one or more potential subsequent locations of the device;
   a decision engine component that receives information from other components and makes decisions related to power states of the computing device and whether to transfer loads to remote devices, the decision engine component further configured to receive information from a plurality of remote devices describing characteristics of the plurality of remote devices, a monetary cost of power for the remote devices, and to determine suitability of each of the plurality of remote devices to perform one or more of the loads;
   a load transfer component that transfers a computing load from the computing device to a secondary computing device as directed by the decision engine based on a determined monetary power cost; and
   a power conserving component that transitions the computing device from the current power state to another or prevents a transition from the current power state based on location information.

13. The system of claim 12 wherein the power cost component coordinates with the location awareness component to know the cost of power in a present location versus cost of power in one or more expected subsequent locations.

14. The system of claim 12 wherein the location awareness component accesses an electronic calendar associated with the user of the device to determine locations where the device may be geographically located during future appointments.

15. The system of claim 12 wherein the location awareness component tracks historical information and trends to determine habits of the user and where the user may take the device at any particular time.

16. The system of claim 12 wherein the decision engine component receives a power policy from an administrator that determines one or more goals that the decision engine attempts to satisfy.

17. The system of claim 12 further comprising an application communication component that provides an event-based communication facility between applications operating on the computing device to coordinate power needs and power availability on the computing device.

18. A computer-readable storage medium comprising instructions for controlling a computer system to transfer a computing load from one computing device to another computing device, wherein the instructions, upon execution, cause a processor to perform actions comprising:
   receiving a request to execute a task that will produce a computational load on one or more resources of the computing device;
   determining a location associated with the computing device that determines availability of additional power and/or computing resources wherein determining further comprising determining an availability of power and whether the computing device's current power level is sufficient to complete tasks that will occur before the user reaches a location of an additional power source;
   identifying one or more alternative devices for performing the requested task;
   determining a monetary power cost for executing the requested load locally on the computing device and at one or more of the identified alternatives; and
   automatically deciding whether to execute the requested load on the local computing device or to transfer at least some of the requested load to an identified alternative computing device.

* * * * *